F. E. WATTS.
UNIVERSAL JOINT.
APPLICATION FILED DEC. 4, 1914.

1,167,455.

Patented Jan. 11, 1916.

Witnesses
E. R. Barrett
James P. Barry

Inventor
Frank E. Watts
By Chittimore Hilbert Chittimore
Attorney's

UNITED STATES PATENT OFFICE.

FRANK E. WATTS, OF DETROIT, MICHIGAN, ASSIGNOR TO HUPP MOTOR CAR COMPANY, OF DETROIT, MICHIGAN, A CORPORATION OF MICHIGAN.

UNIVERSAL JOINT.

1,167,455.　　　　Specification of Letters Patent.　　Patented Jan. 11, 1916.

Application filed December 4, 1914. Serial No. 875,496.

*To all whom it may concern:*

Be it known that I, FRANK E. WATTS, a citizen of the United States of America, residing at Detroit, in the county of Wayne and State of Michigan, have invented certain new and useful Improvements in Universal Joints, of which the following is a specification, reference being had therein to the accompanying drawings.

The invention relates to universal joints and has among the objects thereof to provide a construction of universal joint that may be readily assembled; to provide a construction which will permit the axis of the oppositely-arranged pivot pins or trunnions to lie in the same plane; further, to provide a construction of universal joint, the parts of which, when assembled, are prevented from wearing loose or becoming accidentally disengaged.

Other objects of the invention will more fully hereinafter appear.

Figure 1:
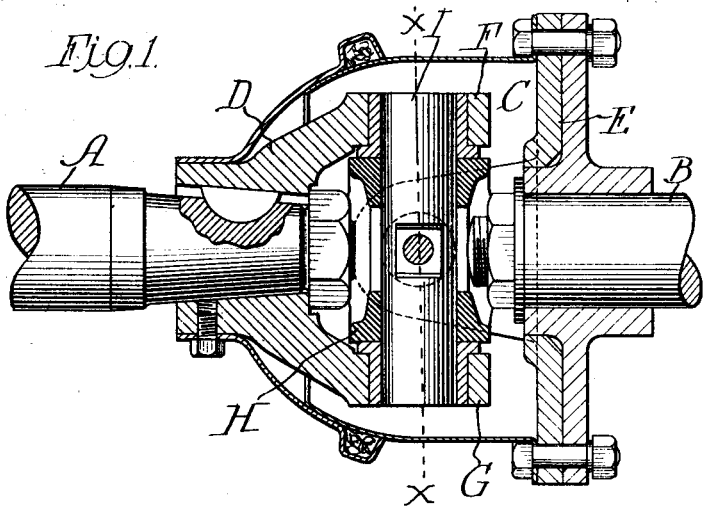
Figure 2:
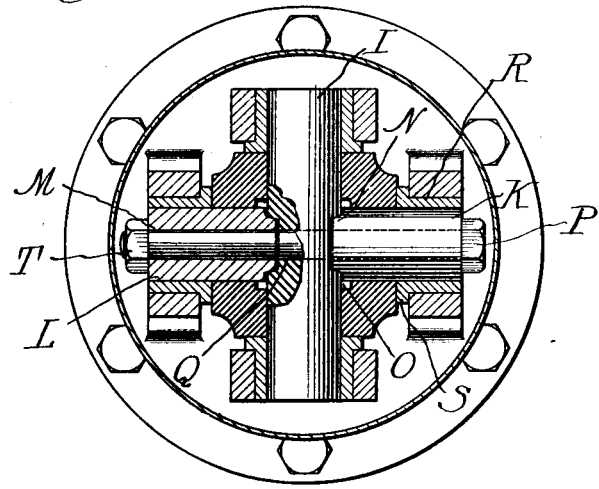
Figure 3:
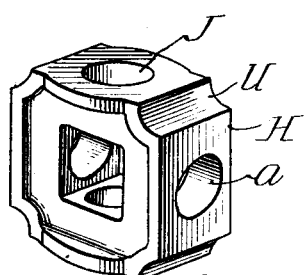

In the drawings, Figure 1 is a section through a joint embodying the invention; Fig. 2 is a section on the line $x$—$x$ of Fig. 1; and Fig. 3 illustrates a detail of construction.

A and B designate the shafts to be connected, and C is the universal joint for securing the shafts together. Referring more particularly to the one embodiment of the invention shown in the drawings, the joint comprises members D and E fixedly connected to the shafts A and B respectively and each provided with a forked portion, the arms of which have alined bearings F and G. It is very desirable to have the bearings F and G formed by apertured portions rather than by forking or slotting the ends of the arms. To permit of this the pivot pins are formed separate from the bearing block H. These pivot pins are however, so connected to the block as to avoid any tendency of the pivot pins to work loose.

As shown, I is one of the pivot pins, which is arranged within the bearings F and G on the member D and extends through an aperture J in the block H. The other pivot pin is composed of two studs K and L each having a longitudinal central bore or aperture M. The outer ends of these studs are arranged in the bearings F and G of the member E, while their inner ends extend within apertures $a$ at right angles to the aperture J. The inner ends of the studs are tapered as indicated at N to engage diametrically-opposed, tapering seats O in the pin I.

P is a bolt extending through the bores M of the studs K and L and through a bore Q in the member I and acting to rigidly clamp the studs together and to force the tapering ends N thereof within the seats O. By this arrangement not only are the studs K and L properly secured to the block H, but the engagement between the inner ends of the studs and the member I serves to connect the pin I to the block and further, to anchor the studs and the pin I to the member H against rotation therein. Preferably the bearings F and G of the members D and E are provided with bushings R, each of which has a collar or annular flange S arranged intermediate the face of the block and the inner face of the bearing, the faces of the block being flat, as shown in Fig. 3.

In assembling the joint, after the bushings R are engaged with the bearings F and G of one of the shaft-engaging members as D, the block is arranged between the arms of the member D and the pin I inserted through the bushings and the aperture J. The bushings are then engaged with the bearings F and G of the member D and after the bushings are alined with the apertures $a$ in the block H, the studs are inserted in place and the bolt P then passed through the studs and the aperture Q in the member I. Upon tightening of the nut T the parts will be rigidly connected together. Since the bolt P does not turn in relation to the studs, nor the latter turn within the block H, there is no tendency for the bolt to become loosened. The apertures $a$ and J in the block H have their axes lying in the same plane, which is of course, desirable in universal joint constructions.

As will be noted, the corners of the block H are cut away as indicated at U to provide suitable clearance between the edges of the block and the bearings F and G.

While the preferred form of the invention has been shown and described, it is not desired to limit the protection to the particular structure illustrated, but the invention is believed to be of sufficient scope to embody various modifications.

What I claim as my invention is:

1. In a universal joint, the combination with two shafts having adjacent ends of complementary forked members respectively carried by said shafts, the forks of said members being provided with bearings, the bearings of one member being arranged at right angles to those of the other, of a block interposed between the said shafts, having opposite recessed faces to respectively accommodate the adjacent ends of the two shafts, the latter being extended through the forked members and transverse pivot pins carried by said block and detachable therefrom, engaging said bearings of the forked members.

2. In a universal joint, the combination with complementary forked members, the forks of said members being circularly apertured to form bearings, a block having bores extending therethrough at right angles to one another, a pin journaled in the bearings of one of said members and extending through one of the bores of said block, alined studs having their outer ends journaled in the bearings of the other member and their inner ends arranged in the other of said bores, said pin having diametrically-opposed tapering recesses, and the inner ends of said studs being tapered to engage said recesses, a bolt passing through said studs and said pin for clamping the inner ends of said studs firmly within the recessed portions of said pin, having its head bearing against the outer end of one of the studs, and a nut carried by the bolt bearing upon the outer end of the other stud.

In testimony whereof I affix my signature in presence of two witnesses

FRANK E. WATTS.

Witnesses:
  Don T. Hastings,
  Granville C. Aldrich.